United States Patent
Shigeno

(10) Patent No.: US 9,924,054 B2
(45) Date of Patent: Mar. 20, 2018

(54) ELECTRONIC DEVICE

(71) Applicant: Brother Kogyo Kabushiki Kaisha, Nagoya (JP)

(72) Inventor: Hiroaki Shigeno, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 0 days.

(21) Appl. No.: 15/212,374

(22) Filed: Jul. 18, 2016

(65) Prior Publication Data
US 2017/0034373 A1 Feb. 2, 2017

(30) Foreign Application Priority Data
Jul. 30, 2015 (JP) .................... 2015-150942

(51) Int. Cl.
H04N 1/04 (2006.01)
H04N 1/00 (2006.01)

(52) U.S. Cl.
CPC ....... *H04N 1/00525* (2013.01); *H04N 1/0083* (2013.01); *H04N 1/00795* (2013.01); *H04N 2201/0094* (2013.01)

(58) Field of Classification Search
CPC .. H04N 1/193; H04N 1/1013; H04N 1/02815; H04N 1/0316; H04N 1/1017; H04N 1/00795; H04N 1/0083; H04N 2201/0094; H04N 2201/0082; H04N 1/32358; H04N 1/12; H04N 2201/0081
USPC ............... 358/471, 474, 401, 501, 505, 468
See application file for complete search history.

(56) References Cited

U.S. PATENT DOCUMENTS

| | | | | |
|---|---|---|---|---|
| 5,934,929 A * | 8/1999 | Saka | .............. | H01R 4/2416 439/404 |
| 6,246,591 B1 * | 6/2001 | Ikeda | .............. | B41J 29/00 174/72 A |
| 6,655,981 B2 * | 12/2003 | Seki | .............. | H01R 4/2429 439/403 |
| 6,923,671 B2 * | 8/2005 | Uezono | .............. | H01R 4/2425 439/404 |
| 7,623,359 B2 * | 11/2009 | Kawasaki | .............. | B41J 29/02 361/807 |
| 2004/0149487 A1 | 8/2004 | Yamamoto | | |
| 2006/0034633 A1 * | 2/2006 | Tsusaka | .............. | G03G 15/80 399/107 |

(Continued)

FOREIGN PATENT DOCUMENTS

JP 3775389 B2 5/2006

*Primary Examiner* — Cheukfan Lee
(74) *Attorney, Agent, or Firm* — Burr & Brown, PLLC

(57) ABSTRACT

An electronic device includes: wires; electronic components; a control board connected to the electronic components via the wires, configured to control the electronic components, and having a first surface and a second surface; a first frame opposed to the first surface and supporting the control board; connectors arranged on the second surface of the control board, at least one of the wires each being connected to a corresponding one of the connectors; an insulated member interposed between the first frame and the first surface of the control board in a first direction; and a positioner formed on the insulated member and extending from the insulated member toward the control board in the first direction. The positioner positions at least one specific wire at a position farther from the insulated member than the second surface.

14 Claims, 13 Drawing Sheets

(56) References Cited

U.S. PATENT DOCUMENTS

| | | | |
|---|---|---|---|
| 2007/0207640 A1* | 9/2007 | Kawasaki | B41J 29/02 439/76.2 |
| 2008/0180760 A1* | 7/2008 | Andoh | H04N 1/00519 358/497 |

* cited by examiner

ELECTRONIC DEVICE

CROSS REFERENCE TO RELATED APPLICATION

The present application claims priority from Japanese Patent Application No. 2015-150942, which was filed on Jul. 30, 2015, the disclosure of which is herein incorporated by reference in its entirety.

BACKGROUND

Technical Field

The following disclosure relates to an electronic device.

Description of the Related Art

There is known a conventional electronic device including a housing, a plurality of electronic components provided in the housing, a power board, a bottom plate, and an insulated sheet.

Wires extending from the respective electronic components are connected to the power board via connectors. Examples of the wires include harnesses and flat flexible cables (FFCs). The bottom plate is opposed to a lower surface of the power board. The insulated sheet is interposed between the bottom plate and the lower surface of the power board. The insulated sheet is provided with a guide portion that is formed by bending. This guide portion guides various kinds of wires connected to the power board.

SUMMARY

Incidentally, some electronic devices of this kind include a control board in addition to the power board. The control board may have a construction similar to that of the power board. Recently, reduced size of the device is demanded. To achieve this demand, it is possible to consider reducing the size of the control board. In this case, the smaller the size of the control board, the nearer the connectors are arranged on the control board, which increases a possibility that the wires are moved closer to each other over the control board. These wires may be affected by each other's noise, leading to operational failures and performance deterioration of the electronic components.

Accordingly, an aspect of the disclosure relates to an electronic device including a control board of a small size with suppression of operational failures and performance deterioration of electronic components.

In one aspect of the disclosure, an electronic device includes: a housing; a plurality of wires; a plurality of electronic components provided in the housing; a control board provided in the housing and connected to the plurality of electronic components via the plurality of wires, the control board being configured to control the plurality of electronic components, the control board including a first surface and a second surface that is a back of the control board from the first surface, the plurality of wires including at least one specific wire; a first frame provided in the housing and opposed to the first surface of the control board, the first frame supporting the control board; a plurality of connectors arranged on the second surface of the control board, at least one of the plurality of wires each being connected to a corresponding one of the plurality of connectors; an insulated member interposed between the first frame and the first surface of the control board, wherein the first frame, the insulated member, and the control board overlap each other in a first direction; and a positioner formed on the insulated member and extending from the insulated member toward the control board in the first direction, the positioner being configured to position the at least one specific wire at a position farther from the insulated member than the second surface.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Hereinafter, there will be described embodiments by reference to the drawings.

First Embodiment

Figure 1:
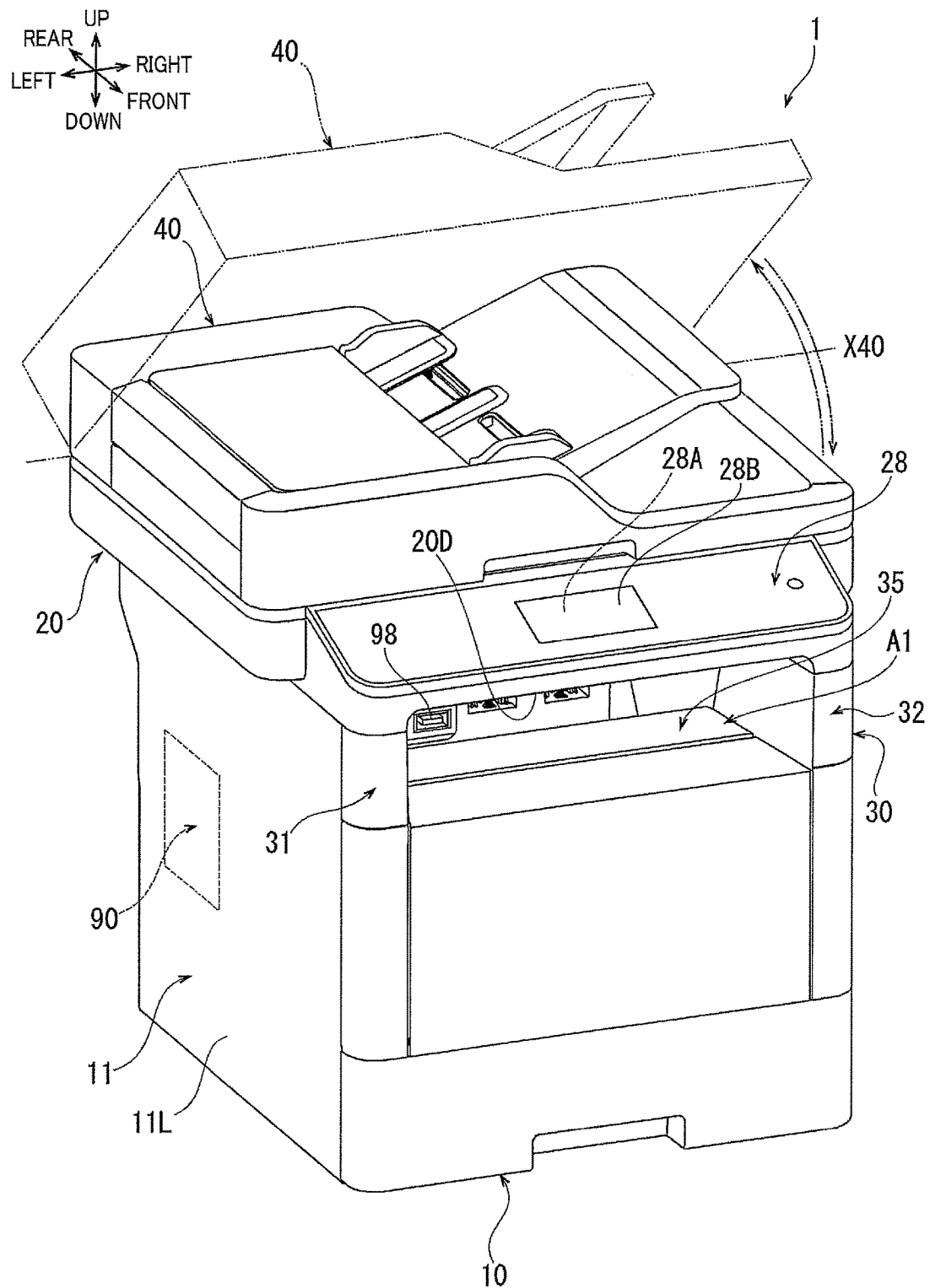
FIG. 1 is a perspective view of an image reading apparatus according to a first embodiment.

As illustrated in FIG. 1, an image reading apparatus 1 according to a first embodiment is one example of an electronic device. This image reading apparatus 1 is a multi-function peripheral (MFP) capable of executing a plurality of processings including an image reading processing and an image forming processing. In the following description, a side of the image reading apparatus 1 on which an operation panel 28 illustrated in FIG. 1 is provided is defined as a front side. A side located to the left of the operation panel 28 is defined as a left side. Front, rear, right, left, up, and down directions are defined with respect to these sides.

Overall Construction

Figure 2:
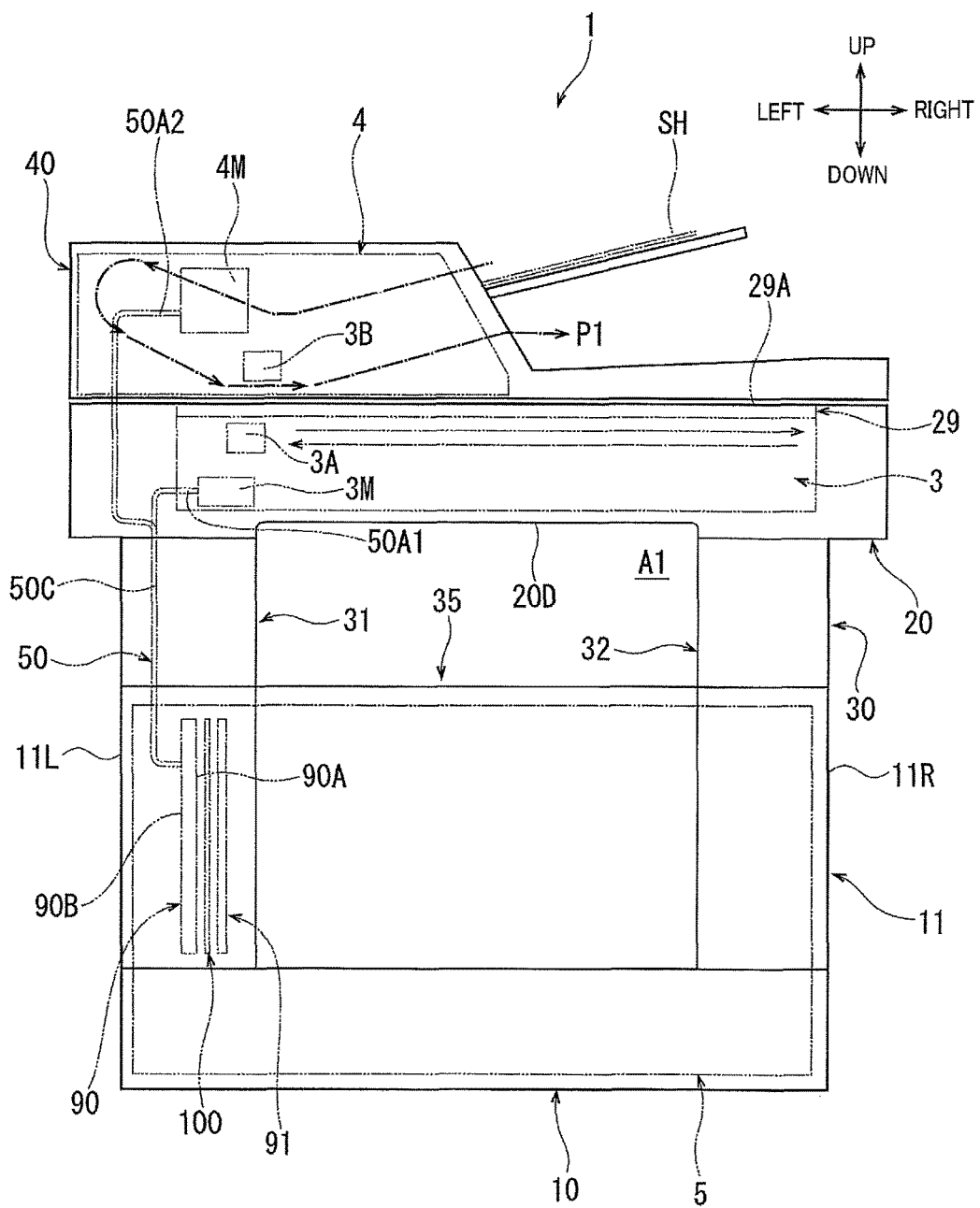
FIG. 2 is a schematic front elevational view of the image reading apparatus according to the first embodiment.
Figure 3:
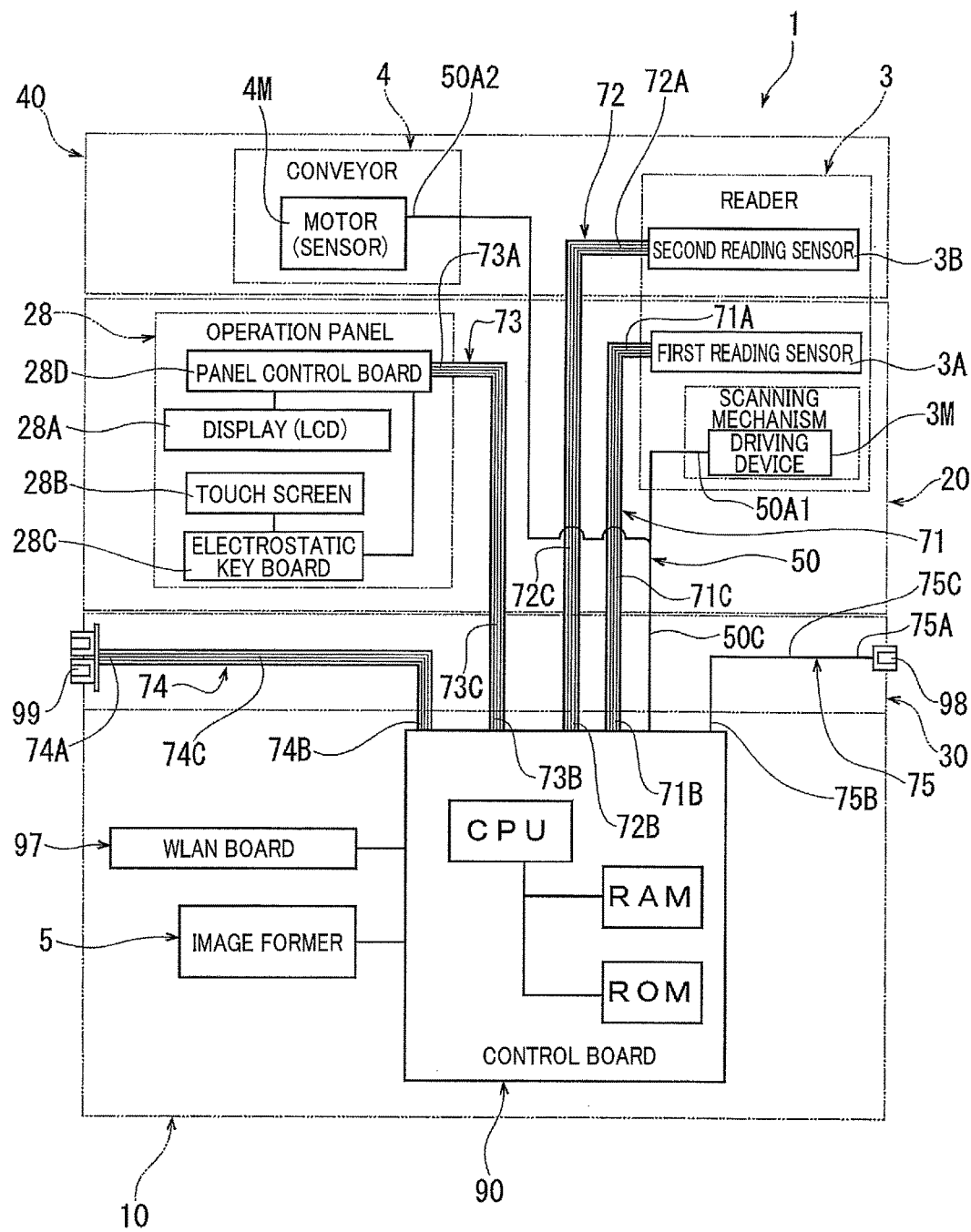
FIG. 3 is a block diagram illustrating the image reading apparatus according to the first embodiment.

As illustrated in FIGS. 1-3, the image reading apparatus 1 includes a main body unit 10, a reading unit 20, and an upper unit 40. The reading unit 20 is provided on the main body unit 10. The upper unit 40 is provided on the reading unit 20. Each of a housing of the main body unit 10, a housing of the reading unit 20, and a housing of the upper unit 40 is one example of a housing. These housings are constituted by components in combination such as an exterior cover, an internal frame, and a frame that also serves as an exterior cover.

Front, rear, right, and left portions of the main body unit 10 are surrounded by an exterior cover 11. FIG. 2 illustrates a right cover 11R and a left cover 11L. The right cover 11R is a right portion of the exterior cover 11, and the left cover 11L is a left portion of the exterior cover 11. Devices and components provided in the exterior cover 11 include an internal frame, not illustrated, an image former 5 illustrated in FIGS. 2 and 3, and a control board (control circuit board) 90 illustrated in FIGS. 1-3, 5-7, and 9. The image former 5 and the control board 90 are disposed in the main body unit 10 in a state in which the image former 5 and the control board 90 are held by the internal frame, not illustrated. The image former 5 is an ink-jet or laser image forming device which forms an image on a sheet. As illustrated in FIGS. 1 and 2, the control board 90 is disposed in the main body unit 10 at a position adjacent to the left cover 11L. The control board 90 has a substantially rectangular shape extending in the up and down direction and the front and rear direction. The control board 90 is opposed to an inner surface of the left cover 11L.

As illustrated in FIG. 3, the control board 90 is provided with devices including a central processing unit (CPU), a random access memory (RAM), and a read only memory (ROM). The control board 90 controls the image former 5 to execute the image forming processing. The control board 90 controls the reader 3 and the conveyor 4 to execute the image reading processing. The control board 90 executes various kinds of processings, such as an input/output processing and a communication processing, via the operation panel 28, a modem connector 99, a USB connector 98, and a wireless LAN (WLAN) board 97.

As illustrated in FIGS. 1-9, the main body unit 10 includes a joint cover 30. The joint cover 30 is assembled to the internal frame, not illustrated, of the main body unit 10 from above so as to serve as an upper surface of the main body unit 10.

Figure 4:
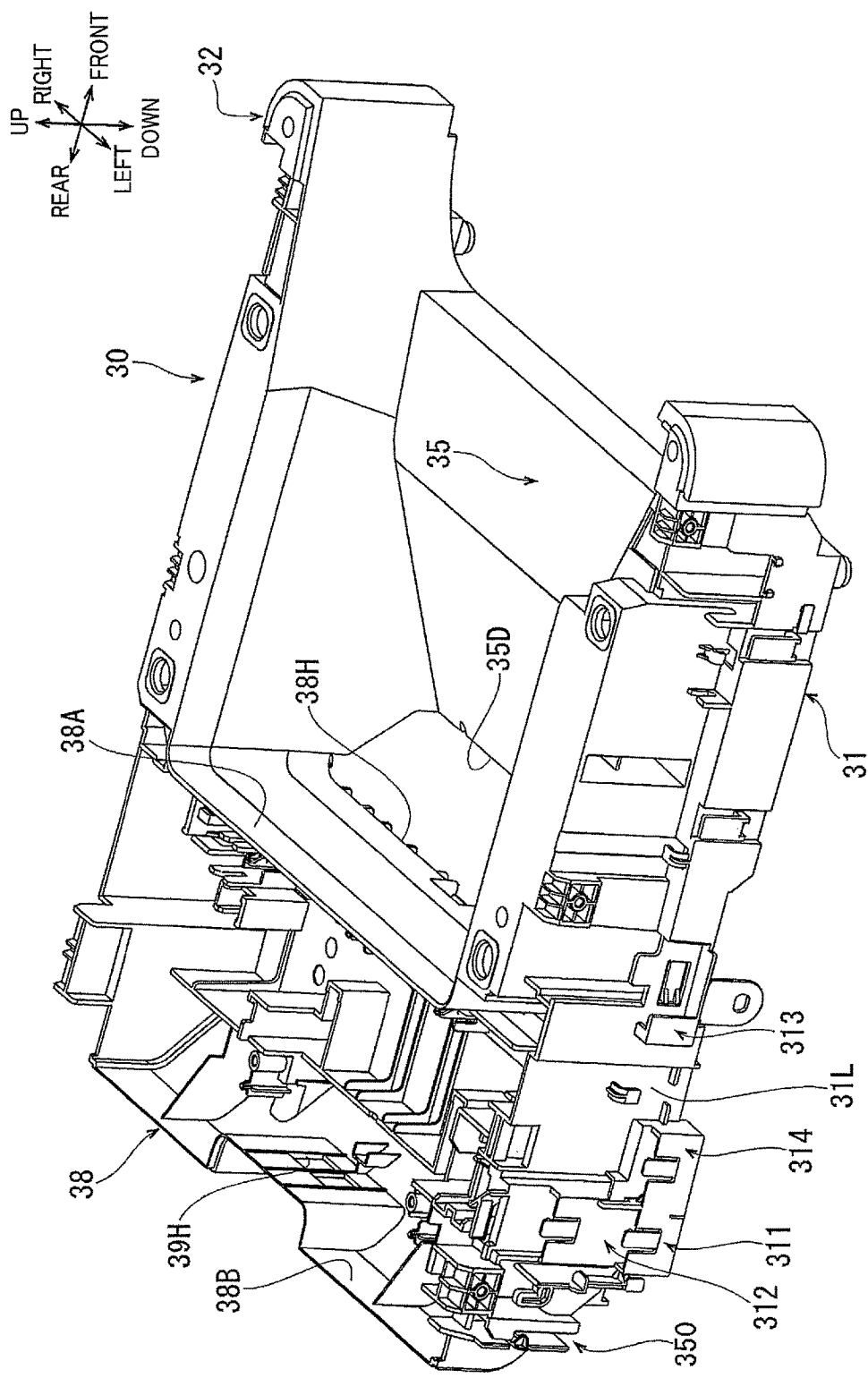
FIG. 4 is a perspective view of a joint cover of the image reading apparatus according to the first embodiment.

Specifically, as illustrated in FIG. 4, the joint cover 30 includes a support surface 35, a first coupler 31, a second coupler 32, and a third coupler 38. The first coupler 31 is located to the left of the support surface 35 in the joint cover 30. The second coupler 32 is located to the right of the support surface 35 in the joint cover 30. The third coupler 38 is located at a rear of the support surface 35 in the joint cover 30. The third coupler 38 extends in the right and left direction so as to be connected to rear end portions of the first coupler 31 and the second coupler 32. It is noted that the third coupler 38 has a particular width in the front and rear direction and is connected to the rear end portions of the first coupler 31 and the second coupler 32 at a front wall 38A in the third coupler 38. A rear wall 38B is disposed at a rear of the front wall 38A in the third coupler 38. A portion of the rear wall 38B partly serves as a rear cover 11B that is a portion of the exterior cover 11.

The support surface 35 is connected to lower end portions of the first coupler 31 and the second coupler 32. That is, the support surface 35 is interposed between the first coupler 31 and the second coupler 32 in the right and left direction.

A rear edge 35D of the support surface 35 is located below an output opening 38H which is formed in the front wall 38A of the third coupler 38. The support surface 35 is inclined upward and frontward from the rear edge 35D and then extends frontward substantially horizontally. The support surface 35 supports sheets recorded by the image former 5 and discharged through the output opening 38H. The output opening 38H communicates with a space in which the image former 5 is disposed. A sheet on which an image is formed by the image former 5 passes through the output opening 38H when discharged onto the support surface 35.

As illustrated in FIGS. 1 and 2, an upper end portion of the first coupler 31 of the joint cover 30, an upper end portion of the second coupler 32 of the joint cover 30, and a bottom wall 20D of the reading unit 20 are coupled to each other, whereby the main body unit 10 and the reading unit 20 are coupled to each other.

The sheet recorded by the image former 5 is discharged to a discharge space A1 illustrated in FIGS. 1 and 2. This discharge space A1 is defined by the support surface 35 of the joint cover 30, a surface of the first coupler 31 which is in contact with a left edge of the support surface 35, a surface of the second coupler 32 which is in contact with a right edge of the support surface 35, and the bottom wall 20D of the reading unit 20. It is noted that the discharge space A1 is open in a front portion of the image reading apparatus 1. A user inserts his or her hand into the discharge space A1 from a front of the image reading apparatus 1 to take the sheet supported on the support surface 35.

As illustrated in FIG. 1, the housing of the main body unit 10 includes the left cover 11L of the exterior cover 11. The left cover 11L covers components and devices in the main body unit 10 from a left thereof. The components and devices covered with the left cover 11L include the internal frame, not illustrated, the image former 5, the first coupler 31 of the joint cover 30, and the control board 90. FIGS. 5-9 illustrates a state in which the left cover 11L is removed from the main body unit 10.

As illustrated in FIGS. 4-9, a left surface 31L of the first coupler 31 which faces leftward is provided with a harness holder 350, a first flat cable holder 311, a second flat cable holder 312, a third flat cable holder 313, and a fourth flat cable holder 314.

The harness holder 350 includes three walls formed at a rear end portion of the left surface 31L of the first coupler 31. These walls protrude leftward from the left surface 31L of the first coupler 31, extend in the up and down direction, and are opposed to each other in the front and rear direction. The harness holder 350 holds an intermediate portion 50C of a wire harness 50 which will be described below.

Each of the first flat cable holder 311, the second flat cable holder 312, and the fourth flat cable holder 314 defines a space surrounded by front, rear, right, and left walls. Each of the first flat cable holder 311, the second flat cable holder 312, and the fourth flat cable holder 314 has a bottom portion, through which a hole is formed in the up and down direction. This through hole has a rectangular shape elongated in the front and rear direction. A first flat cable 71, a second flat cable 72, and a fourth flat cable 74 which will be described below are inserted through these rectangular holes. The third flat cable holder 313 is provided with upper, lower, right, and left walls. A hole is formed through the third flat cable holder 313 in the front and rear direction. A third flat cable 73 which will be described below is inserted through this hole.

Figure 5:
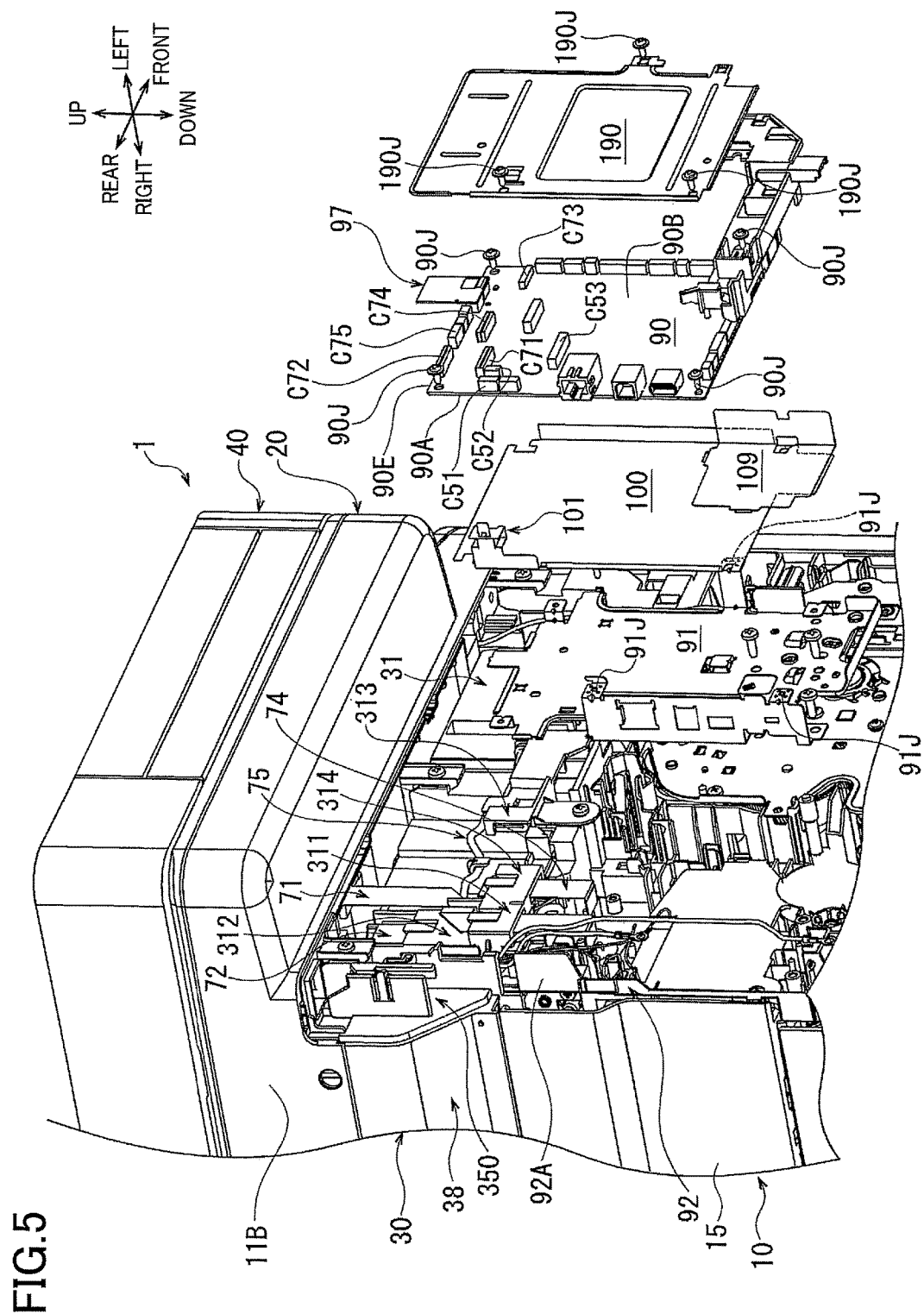
FIG. 5 is a partial perspective view of a portion of the image reading apparatus according to the first embodiment, with components such as a control board, a first frame, and an insulated sheet being illustrated so as to be separated from a main body.

As illustrated in FIGS. 2, 5-7, and 9, the control board 90 is located under the first coupler 31 of the joint cover 30. FIG. 5 illustrates the control board 90 and components disposed near the control board 90, such as a first frame 91, an insulated sheet 100, a lower insulated sheet 109, and a control board cover 190, in a disassembled state.

The first frame 91 is formed by bending a metal plate such as a steel sheet. The first frame 91 has a substantially rectangular shape larger than the control board 90 and extends in the up and down direction and the front and rear direction. The first frame 91 is assembled so as to be located to the left of the image former 5. The first frame 91 constitutes a portion of the internal frame of the main body unit 10. Portions of a front edge and a rear edge of the first frame 91 are bent leftward so as to form upright walls or protruding pieces. Three fasteners 91J are formed in distal end portions of the respective upright walls or protruding pieces.

A surface of the control board 90 which faces rightward is defined as a first surface 90A. A surface of the control board 90 which faces leftward is defined as a second surface 90B. A plurality of connectors C51, C52, C53, C71, C72, C73, C74, C75 are provided on the second surface 90B of the control board 90. Other connectors not assigned with reference numerals are also disposed on the second surface 90B of the control board 90.

A plurality of set screws 90J are inserted through the control board 90 from the left and threaded into the first frame 91 in a state in which the first frame 91 is opposed to the first surface 90A of the control board 90 from the right. As a result, as illustrated in FIG. 2, the first frame 91 supports the control board 90. The insulated sheet 100 is fastened to the first frame 91 with the control board 90 by the set screws 90J in a state in which the insulated sheet 100 is interposed between the first frame 91 and the first surface 90A of the control board 90. The first frame 91, the insulated sheet 100, and the control board 90 overlap each other in the right and left direction that is one example of a first direction.

Figure 6:
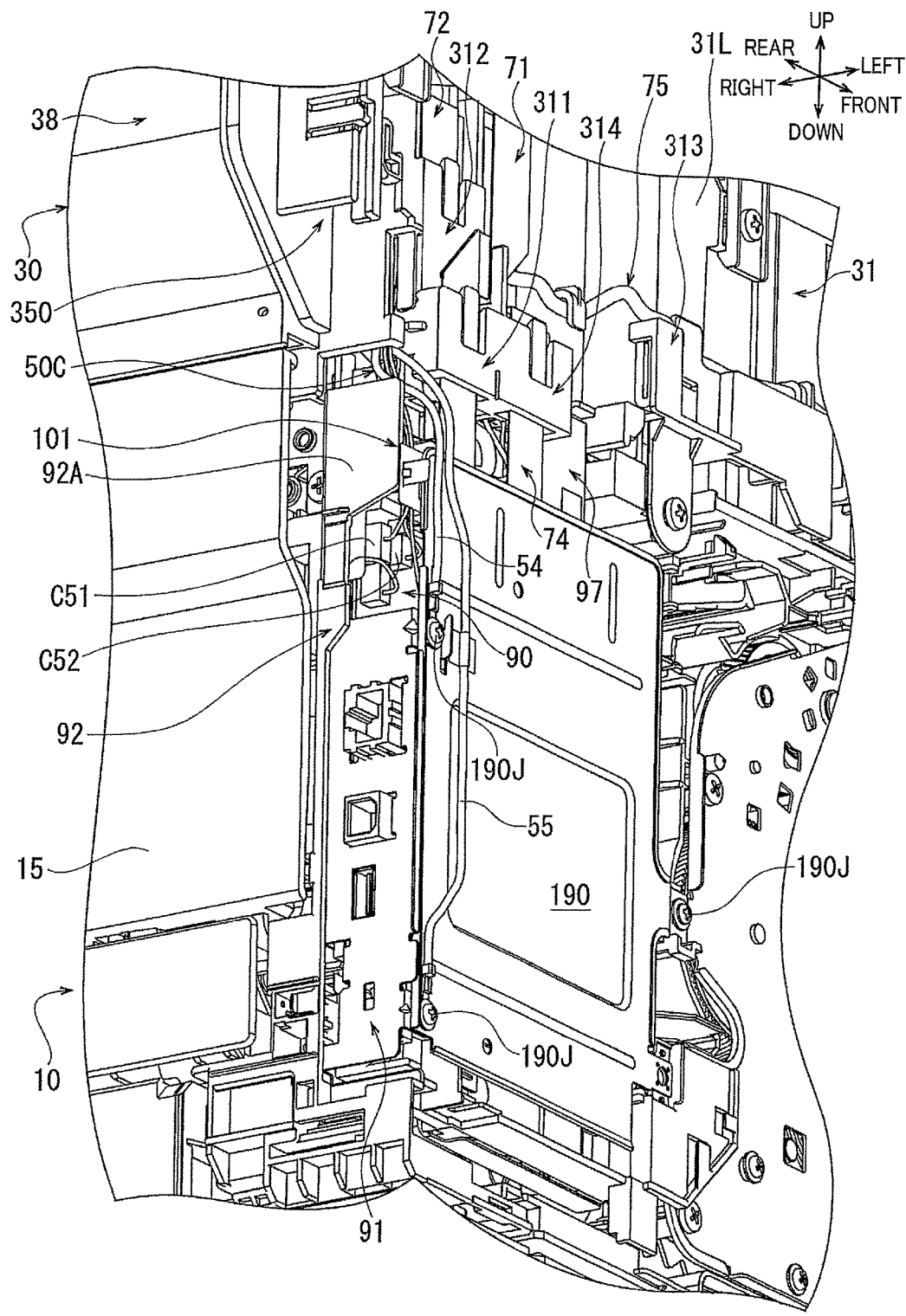
FIG. 6 is a partial perspective view of a portion of the image reading apparatus according to the first embodiment, mainly illustrating components such as the control board, the first frame, and a positioner formed with the insulated sheet in a state in which these components are assembled to the main body.

As illustrated in FIGS. 5 and 6, a second frame 92 is disposed on a rear portion of the main body unit 10. The second frame 92 is covered with the rear cover 11B of the exterior cover 11 from the rear and extends in the up and down direction and the right and left direction. A flat plate 92A is formed on a left edge of the second frame 92 so as to extend leftward. The flat plate 92A disposed adjacent to a rear portion of an upper and rear corner portion of the first frame 91 and the control board 90. Specifically, the first frame 91 and the control board 90 are disposed so as to be perpendicular to a front surface of the flat plate 92A.

As illustrated in FIG. 5, the insulated sheet 100 is formed by being cut from a insulated sheet. In the present embodiment, the insulated sheet 100 is formed of PET resin, for example. The insulated sheet 100 is one example of an insulated member. The insulated sheet 100 has a substantially rectangular shape slightly larger than the control board 90. The insulated sheet 100 extends in the up and down direction and the front and rear direction. Front and rear end portion of the insulated sheet 100 are bent leftward.

Figure 10:
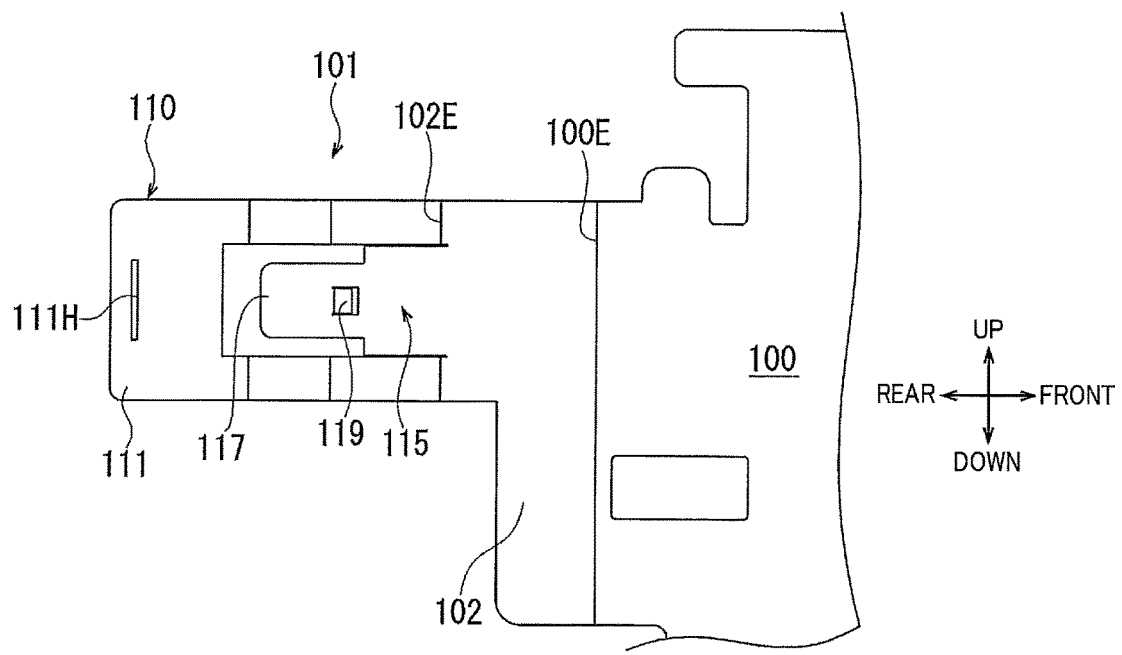
FIG. 10 is a developed view of the positioner formed with the insulated sheet in the image reading apparatus according to the first embodiment.
Figure 11:
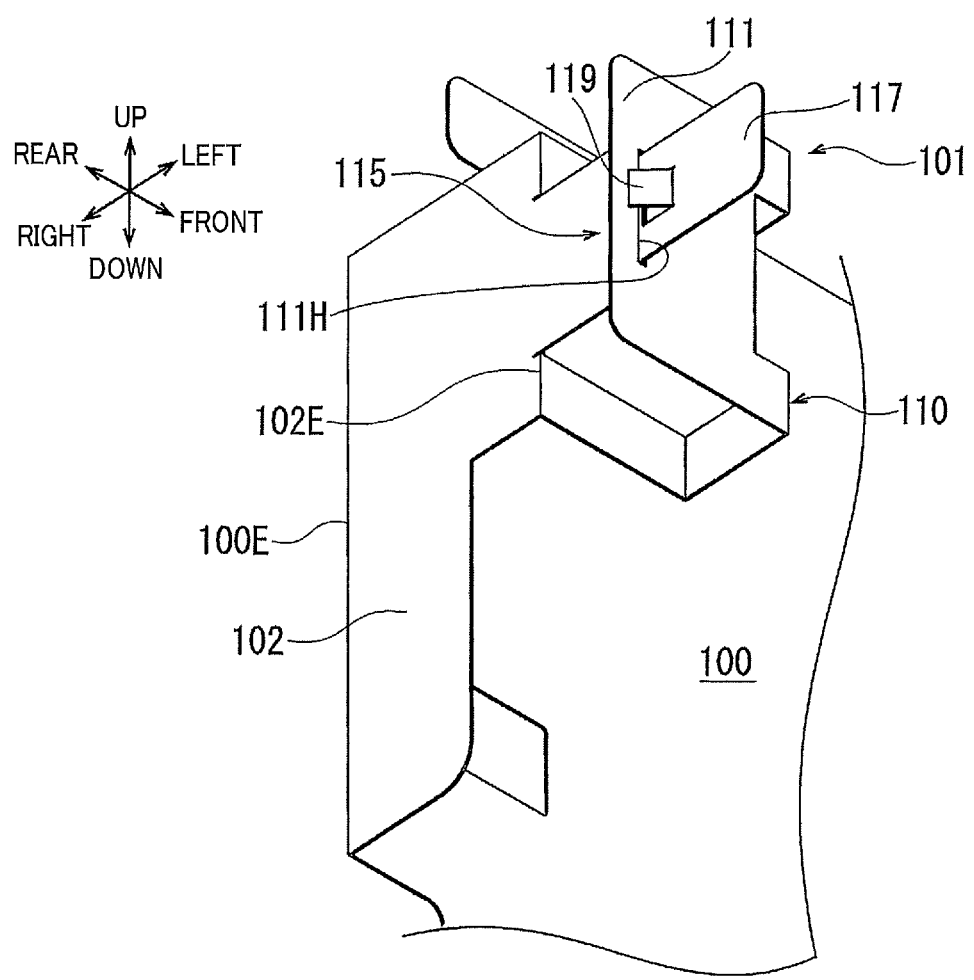
FIG. 11 is a partial perspective view of the positioner formed with the insulated sheet in the image reading apparatus according to the first embodiment.

As illustrated in FIGS. 6-9, the insulated sheet 100 is formed with a positioner 101. This positioner 101 is one example of a positioner, a holder, a surrounding member, and an accommodating member. The positioner 101 is provided at an upper and rear corner portion of the insulated sheet 100. FIG. 10 illustrates the positioner 101 in its developed state. The insulated sheet 100 has a small protrusion protruding rearward from an edge 100E of the insulated sheet 100 which extends in the up and down direction. The small protrusion has cutouts and slits. As illustrated in FIG. 11, the small protrusion is bent at a plurality of positions so as to form the positioner 101. Specifically, the positioner 101 has an extending portion 102, a bent portion 110, and an engaging portion 115.

Figure 7:
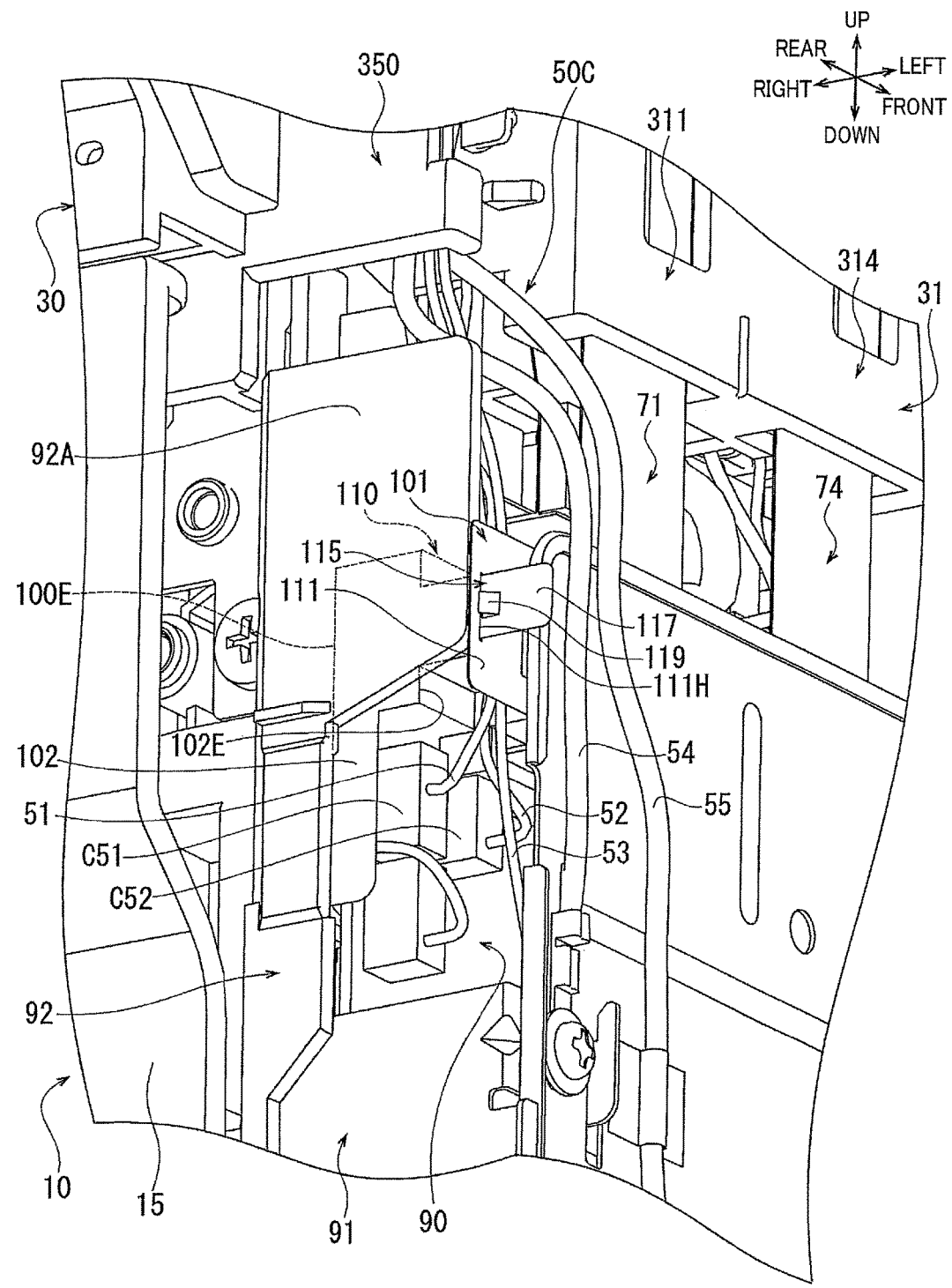
FIG. 7 is a partial enlarged perspective view mainly illustrating the positioner in the image reading apparatus according to the first embodiment.

As illustrated in FIGS. 6-9 and 11, the extending portion 102 is bent from the edge 100E of the insulated sheet 100 substantially perpendicularly to the insulated sheet 100 so as to extend leftward. As illustrated in FIG. 7, the extending portion 102 extends leftward toward the control board 90 along the flat plate 92A of the second frame 92. A left end 102E of the extending portion 102 is located to the left of the second surface 90B of the control board 90.

As illustrated in FIGS. 6-9 and 11, the bent portion 110 and the engaging portion 115 are connected to the left end 102E of the extending portion 102. The bent portion 110 is bent from the left end 102E of the extending portion 102 substantially perpendicularly to the extending portion 102 so as to extend frontward. The bent portion 110 is then bent substantially perpendicularly so as to extend leftward and then bent substantially perpendicularly so as to extend rearward. That is, the bent portion 110 has a three-sided rectangular shape and has (i) a portion extending from the left end 102E of the extending portion 102 in the front and rear direction, (ii) a portion extending in the right and left direction, and (iii) a portion extending in the front and rear direction. An insertion hole 111H is formed through a distal end portion 111 of the bent portion 110.

As illustrated in FIG. 10, the engaging portion 115 is branched off from the bent portion 110 by a substantially C-shaped cutting formed in a substantially center of the bent portion 110 in its developed state. As illustrated in FIG. 11, the engaging portion 115 is branched off from the bent portion 110 at an intermediate portion of the left end 102E of the extending portion 102 in the up and down direction, and then the engaging portion 115 extends leftward.

The engaging portion 115 is formed with a protrusion 117 and a restrainer 119. The protrusion 117 is a distal end portion of the engaging portion 115. The width of the protrusion 117 in the up and down direction is smaller than the other portion of the engaging portion 115. The restrainer 119 is branched off from the protrusion 117 by a substantially C-shaped cutting formed in a substantially center of the protrusion 117.

As illustrated in, e.g., FIG. 11, after the bent portion 110 as described above, the protrusion 117 is inserted into the insertion hole 111H. The restrainer 119 inserted into the insertion hole 111H with the protrusion 117 is bent, which engages the engaging portion 115 with the distal end portion 111 of the bent portion 110. As a result, the bent portion 110 and the engaging portion 115 define a space which has a substantially rectangular shape in cross section when viewed in the up and down direction.

Figure 8:
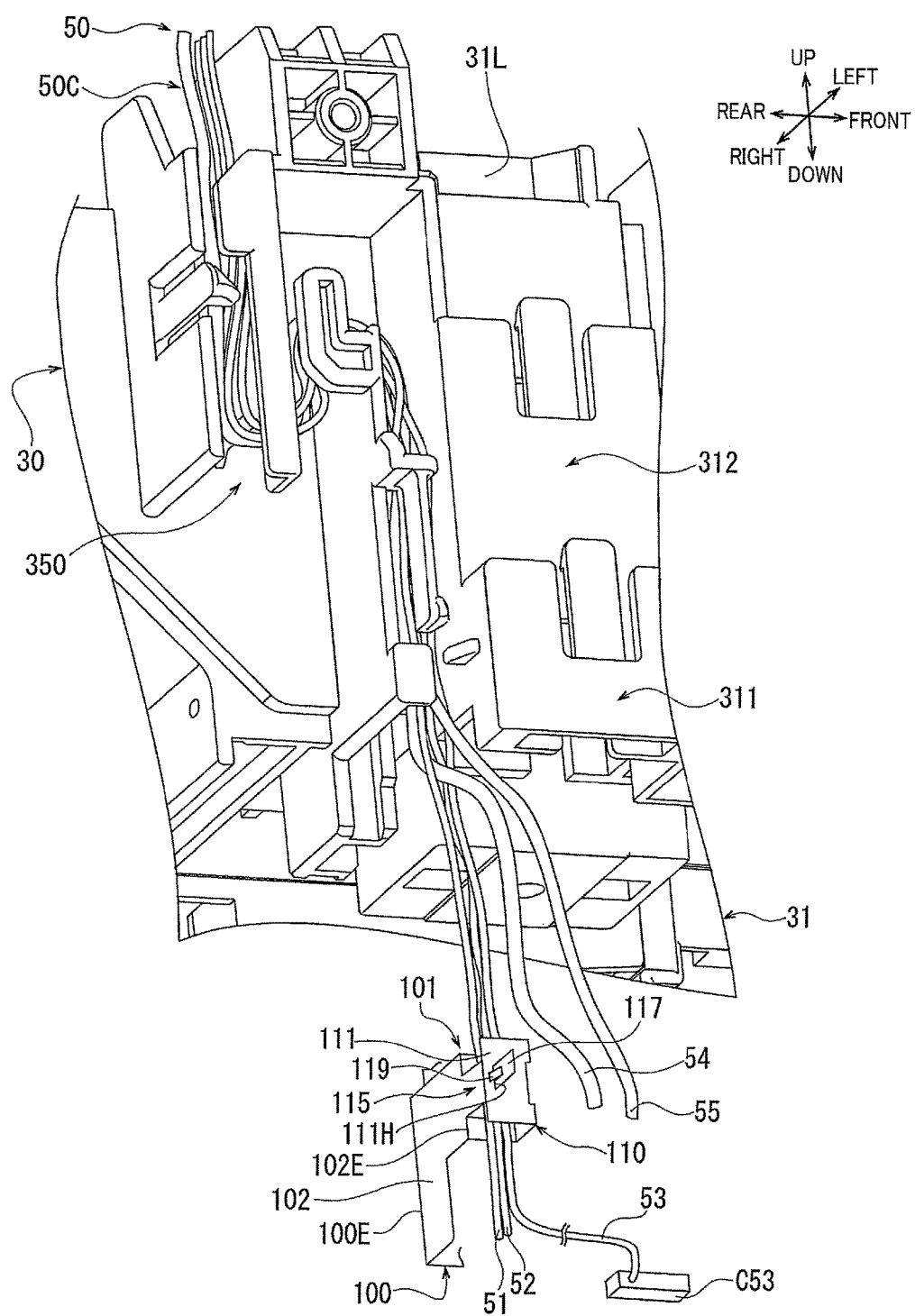
FIG. 8 is a partial perspective view mainly illustrating a positional relationship between a plurality of wires and the positioner in the image reading apparatus according to the first embodiment.

As illustrated in FIGS. 6-8, cables 51-53 which are portions of the wire harness 50 which will be described below are inserted in the up and down direction in the space defined by the bent portion 110 and the engaging portion 115. In the present embodiment, each of cables and covered wires is one example of a wire, and a wire harness is a collection of bundles of such wires.

Figure 9:
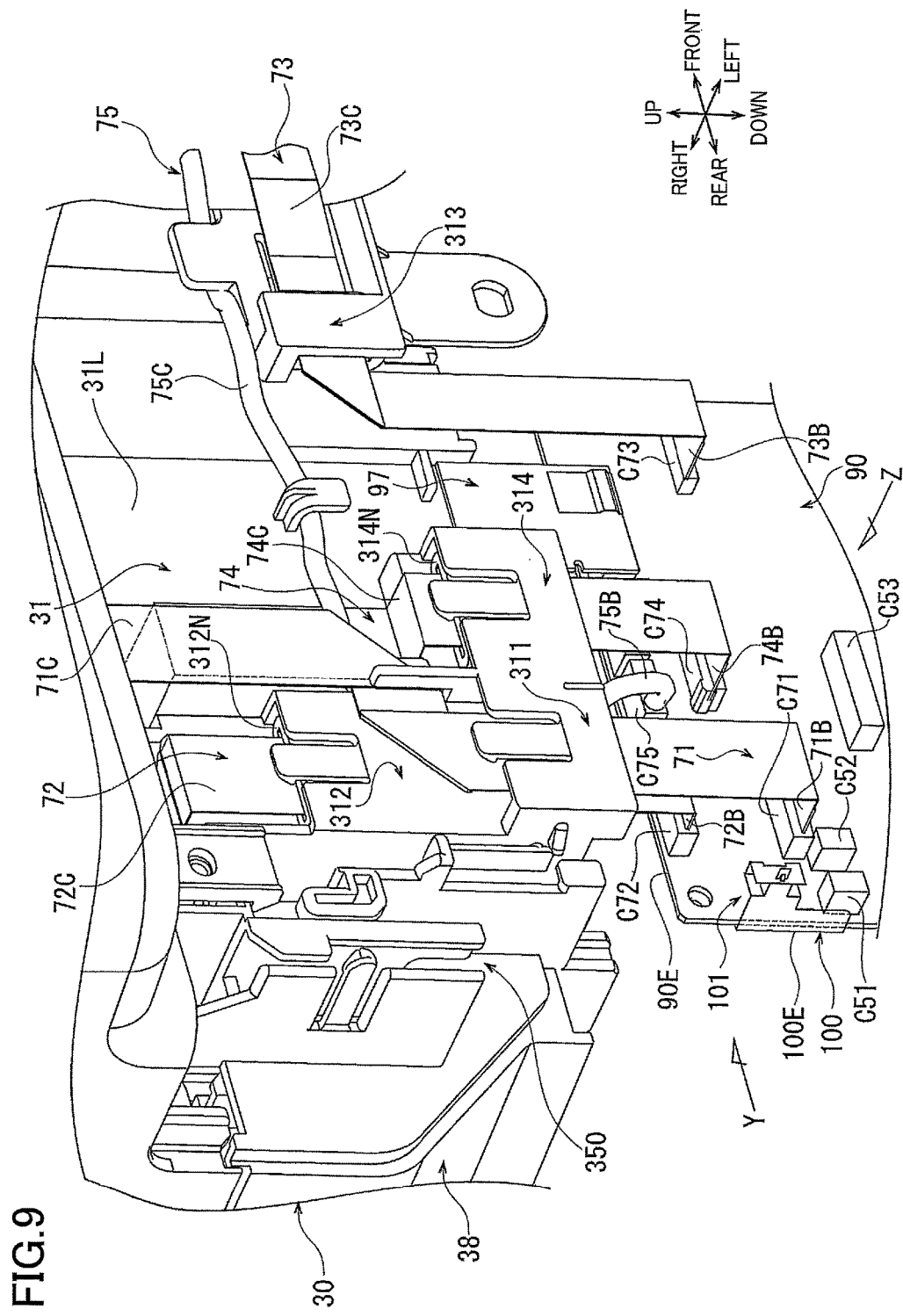
FIG. 9 is a partial perspective view mainly illustrating the control board, the plurality of wires, and the positioner in the image reading apparatus according to the first embodiment.

As illustrated in FIG. 9, the bent portion 110 of the positioner 101 overlaps the second surface 90B when viewed in a direction indicated by the arrow Z as the right and left direction.

Like the insulated sheet 100, the lower insulated sheet 109 is formed of PET resin, for example. Two slits are formed in a front and lower corner portion of the insulated sheet 100. Two protruding pieces protruding from an edge of the lower insulated sheet 109 are fitted into the respective slits, whereby the lower insulated sheet 109 is mounted on the insulated sheet 100. The lower insulated sheet 109 has a substantially rectangular shape smaller than the insulated sheet 100 and extends in the up and down direction and the front and rear direction.

The control board cover 190 has a substantially rectangular shape slightly larger than the control board 90 and extends in the up and down direction and the front and rear direction. The control board cover 190 is opposed to the second surface 90B of the control board 90 from the left. Three set screws 190J are threaded into the respective fasteners 91J of the first frame 91, whereby as illustrated in FIG. 6 the control board cover 190 is assembled to the first frame 91. In this state, the control board cover 190 is sufficiently spaced apart from the control board 90 so as not to interfere with the connectors C51-C53, C71-C75 arranged on the second surface 90B of the control board 90 and wires connected to the connectors C51-C53, C71-C75, for example.

As illustrated in FIG. 9, the control board 90 has an upper end portion 90E extending in the front and rear direction. The first flat cable holder 311, the second flat cable holder 312, and the fourth flat cable holder 314 are located just above the upper end portion 90E. The first flat cable holder 311 is located below the second flat cable holder 312. The fourth flat cable holder 314 is located in front of the first flat cable holder 311. The third flat cable holder 313 is located in front of the fourth flat cable holder 314. The harness holder 350 is located at a rear of the first flat cable holder 311 and the second flat cable holder 312. The harness holder 350 is located above and behind the upper end portion 90E of the control board 90.

As illustrated in FIG. 1, the USB connector 98 is disposed in an upper and left portion of the discharge space A1 formed in the main body unit 10. The USB connector 98 is assembled to the first coupler 31 of the joint cover 30. The USB connector 98 has a connecting portion to which a USB device is connected. This connecting portion is located at the frontmost portion of the discharge space A1.

As illustrated in FIG. 3, one end 75A of a USB cable 75 is connected to the USB connector 98. As illustrated in FIG. 9, the USB cable 75 includes a single flexible tube and a bundle of covered wires provided in the tube. An intermediate portion 75C of the USB cable 75 extends rearward along the left surface 31L of the first coupler 31 of the joint cover 30 and then extends downward. As illustrated in FIGS. 3 and 9, the other end 75B of the USB cable 75 is connected to the connector C75 disposed on the second surface 90B of the control board 90.

In the present embodiment, the intermediate portion 75C of the USB cable 75 is a portion between the one end 75A and the other end 75B. The intermediate portion 75C may or may not be the entire portion of the USB cable 75 between the one end 75A and the other end 75B. This applies to the other cables which will be described below.

As illustrated in FIG. 2, the reading unit 20 includes a platen glass 29. The platen glass 29 is provided on an upper surface of the reading unit 20. An upper surface of the platen glass 29 serves as a document support surface 29A for supporting a document such as a sheet and a book.

As illustrated in FIGS. 2 and 3, a first reading sensor 3A, a driving device 3M, and a scanning mechanism, not illustrated, are provided in the reading unit 20. The first reading sensor 3A is disposed under and opposed to the platen glass 29. The first reading sensor 3A is a well-known image reading sensor such as a contact image sensor (CIS) and a charge coupled device (CCD).

A stepping motor is used as the driving device 3M, for example. The scanning mechanism, not illustrated, holds the first reading sensor 3A. When the scanning mechanism, not illustrated, reads an image formed on a document supported on the document support surface 29A, as illustrated in FIG. 2, the scanning mechanism, not illustrated, is driven by the driving device 3M to reciprocate the first reading sensor 3A in the right and left direction. When the scanning mechanism, not illustrated, reads an image formed on a sheet SH to be conveyed by the conveyor 4, the scanning mechanism, not illustrated, is driven by the driving device 3M to move or keep the first reading sensor 3A to a predetermined static reading position.

A rear end portion of the reading unit 20 is provided with hinges, not illustrated. As illustrated in FIG. 1, the upper unit 40 is supported on the reading unit 20 by these hinges so as to be swung about a pivot axis X40 extending in the right and left direction. In a state in which the upper unit 40 is closed, as illustrated in FIGS. 1 and 2, the upper unit 40 covers the document support surface 29A from above. When the upper unit 40 is swung about the pivot axis X40 such that a front end portion of the upper unit 40 is moved upward and rearward, an open state of the upper unit 40 is established as indicated by the two-dot chain lines in FIG. 1, so that the document support surface 29A is exposed. This open state allows the user to place a document onto the document support surface 29A.

In the present embodiment, a subject of which image is to be read using the document support surface 29A will be referred to as "document", and a subject of which image is to be read during conveyance thereof by the conveyor 4 will be referred to as "sheet SH". The document and the sheet SH may be substantially the same as each other.

As illustrated in FIGS. 2 and 3, the conveyor 4 and a second reading sensor 3B are provided in the upper unit 40. The conveyor 4 includes a motor 4M and a sheet position sensor, not illustrated. As illustrated in FIG. 2, the conveyor 4 conveys the sheets SH one by one along a conveyance path P1.

The second reading sensor 3B is similar to the first reading sensor 3A. As illustrated in FIG. 2, the second reading sensor 3B is opposed to the first reading sensor 3A when the first reading sensor 3A is located at the static reading position. The second reading sensor 3B is capable of reading an image formed on the sheet SH being conveyed along the conveyance path P1. It is noted that the position of the second reading sensor 3B is not limited to the position illustrated in FIG. 2.

As illustrated in FIGS. 2 and 3, the reader 3 includes the first reading sensor 3A, the second reading sensor 3B, the driving device 3M, and the scanning mechanism, not illustrated.

When the scanning mechanism, not illustrated, reads an image formed on a document supported on the document support surface 29A, as illustrated in FIG. 2, the control board 90 controls the first reading sensor 3A and the driving device 3M to reciprocate the first reading sensor 3A in the right and left direction under the platen glass 29. During this reciprocation, the first reading sensor 3A sequentially reads each portion of the image in the front and rear direction (a main scanning direction) while moving in the right and left direction (a sub-scanning direction), to read the entire image formed on the document.

When the scanning mechanism, not illustrated, reads an image formed on a sheet SH to be conveyed by the conveyor 4, the control board 90 controls the driving device 3M to move or keep the first reading sensor 3A to the predetermined static reading position. The control board 90 then controls the first reading sensor 3A, the second reading sensor 3B, and the motor 4M of the conveyor 4 such that the first reading sensor 3A reads an image formed on one surface of the sheet SH conveyed by the conveyor 4 through an area over the first reading sensor 3A located at the static reading position, and the second reading sensor 3B reads an image on the other surface of the sheet SH. When the scanning mechanism, not illustrated, reads an image formed on only one surface of the sheet SH, only the first reading sensor 3A is operated.

As illustrated in FIG. 3, one end 71A of the first flat cable 71 is connected to the first reading sensor 3A. As illustrated in FIG. 9, the first flat cable 71 is constituted by a plurality of covered wires joined together in a strip shape. An intermediate portion 71C of the first flat cable 71 extends downward from the reading unit 20. The intermediate portion 71C of the first flat cable 71 is bent in a crank shape along the left surface 31L of the first coupler 31 of the joint cover 30. A portion of the intermediate portion 71C which is located under the bent portion having the crank shape is located at a rear of a portion of the intermediate portion 71C which is located above the bent portion. Also, the portion of the intermediate portion 71C which is located under the bent portion is inserted into the first flat cable holder 311 and extends downward.

As illustrated in FIGS. 3 and 9, the other end 71B of the first flat cable 71 is connected to the connector C71 disposed on the second surface 90B of the control board 90. As illustrated in FIG. 9, the other end 71B of the first flat cable 71 is connected to the control board 90 below and at a rear of the other end 75B of the USB cable 75.

As illustrated in FIG. 3, one end 72A of the second flat cable 72 is connected to the second reading sensor 3B. As illustrated in FIG. 9, the second flat cable 72 is constituted by a plurality of covered wires joined together in a strip shape. An intermediate portion 72C of the second flat cable 72 as illustrated in FIG. 3 is introduced from the upper unit 40 into the reading unit 20 and as illustrated in FIG. 9 extends downward from the reading unit 20. The intermediate portion 72C of the second flat cable 72 extends downward along the left surface 31L of the first coupler 31 of the joint cover 30, is then inserted into the second flat cable holder 312, and then extends downward. A ferrite core 312N for noise reduction is disposed on the second flat cable holder 312. When viewed in the right and left direction, the intermediate portion 72C of the second flat cable 72 has a portion overlapping the intermediate portion 71C of the first flat cable 71. The first flat cable holder 311 is disposed to the left of the second flat cable holder 312. That is, the first flat cable holder 311 is disposed so as to protrude leftward from the second flat cable holder 312. As a result, the intermediate portion 71C of the first flat cable 71 and the intermediate portion 72C of the second flat cable 72 are kept spaced apart from each other in the right and left direction, thereby suppressing adverse effects due to each other's noise.

As illustrated in FIGS. 3 and 9, the other end 72B of the second flat cable 72 is connected to the connector C72 disposed on the second surface 90B of the control board 90. As illustrated in FIG. 9, the other end 72B of the second flat cable 72 is connected to the control board 90 at a position located at a rear of the other end 75B of the USB cable 75. Also, the other end 72B of the second flat cable 72 is connected to the control board 90 at a position located above the other end 71B of the first flat cable 71.

As illustrated in FIGS. 2 and 3, the wire harness 50 is split into a first end portion 50A1 and a second end portion 50A2 at a position above the intermediate portion 50C. The first end portion 50A1 of the wire harness 50 is connected to the driving device 3M. The second end portion 50A2 of the wire harness 50 is connected to the motor 4M and the sheet position sensor, not illustrated.

As illustrated in FIG. 8, the wire harness 50 is constituted by a bundle of covered wires including the cables 51-53 and ground wires 54, 55. Each of the cables 51-53 may be a single wire and may be a collection of covered wires.

The intermediate portion 50C of the wire harness 50 extends downward from the reading unit 20. The intermediate portion 50C of the wire harness 50 is held by the harness holder 350 provided on the first coupler 31 of the joint cover 30. The intermediate portion 50C of the wire harness 50 extends downward after being bent upward along the harness holder 350 and bent downward.

The cables 51-53 of the wire harness 50 extend to a position below the harness holder 350 and then are inserted into a space defined by the bent portion 110 and the engaging portion 115 of the positioner 101. The cables 51-53 then further extend downward. That is, the positioner 101 extends leftward from the insulated sheet 100 toward the control board 90 and positions and holds the cables 51-53 of the wire harness 50 at a position located to the left of the second surface 90B.

As illustrated in FIG. 7, the cable 51 is connected to the connector C51 disposed on the second surface 90B of the control board 90. The cable 52 is connected to the connector C52 disposed on the second surface 90B of the control board 90. As illustrated in FIG. 8, the cable 53 is connected to the connector C53. As illustrated in FIG. 5, the connector C53 is disposed on the second surface 90B of the control board 90 at a position below the connectors C51, C52.

As illustrated in FIG. 7, the ground wires 54, 55 of the wire harness 50 pass through an area located in front of the cables 51-53 and the positioner 101 and extend downward along a left surface of the control board cover 190. The ground wires 54, 55 are fixed to the control board cover 190 by the set screws 190J at different positions.

As illustrated in FIG. 1, a front end portion of the reading unit 20 protrudes frontward to a position located in front of the upper unit 40. The operation panel 28 is provided on an upper surface of the protruding portion. The operation panel 28 is a user interface for accepting user input and for displaying information about the image reading apparatus 1 such as an operating state and settings.

Specifically, as illustrated in FIGS. 1 and 3, the operation panel 28 includes: a display 28A such as a liquid crystal display (LCD); and a touch screen 28B superposed on the display 28A. As illustrated in FIG. 3, the operation panel 28 contains: an electrostatic key board 28C connected to the touch screen 28B and electrostatic keys, not illustrated; and a panel control board 28D connected to the display 28A and the electrostatic key board 28C.

One end 73A of the third flat cable 73 is connected to the panel control board 28D. As illustrated in FIG. 9, the third flat cable 73 is constituted by a plurality of covered wires joined together in a strip shape. An intermediate portion 73C of the third flat cable 73 extends rearward along the left surface 31L of the first coupler 31 of the joint cover 30, is then inserted into the third flat cable holder 313, and then bent so as to extend downward. As illustrated in FIGS. 3 and 9, the other end 73B of the third flat cable 73 is connected to the connector C73 disposed on the second surface 90B of the control board 90. As illustrated in FIG. 9, the other end 73B of the third flat cable 73 is connected to the control board 90 at a position in front of the other end 75B of the USB cable 75.

As illustrated in FIG. 4, a through hole 39H is formed through the rear wall 38B of the third coupler 38 of the joint cover 30. The modem connector 99 illustrated in FIG. 3 is mounted in the through hole 39H.

As illustrated in FIG. 3, one end 74A of the fourth flat cable 74 is connected to the modem connector 99. As illustrated in FIG. 9, the fourth flat cable 74 is constituted by a plurality of covered wires joined together in a strip shape. Though not illustrated, an intermediate portion 74C of the fourth flat cable 74 extends leftward in front of the rear wall 38B of the third coupler 38 of the joint cover 30 and reaches the left surface 31L of the first coupler 31. As illustrated in FIG. 9, the intermediate portion 74C of the fourth flat cable 74 is bent in a crank shape along the left surface 31L of the first coupler 31. A portion of the intermediate portion 74C which is located under the bent portion having the crank shape is located to the left of a portion of the intermediate portion 74C which is located above the bent portion. Also, the portion of the intermediate portion 74C which is located under the bent portion is inserted into the fourth flat cable holder 314 and extends downward. A ferrite core 314N for noise reduction is disposed on the fourth flat cable holder 314. When viewed in the right and left direction, the intermediate portion 74C of the fourth flat cable 74 has a portion overlapping the intermediate portion 71C of the first flat cable 71.

A portion of the left surface 31L of the first coupler 3 which is located above the fourth flat cable holder 314 is recessed rightward with respect to the fourth flat cable holder 314, that is, the portion is located to the right of the fourth flat cable holder 314. That is, the fourth flat cable holder 314 protrudes leftward with respect to the portion of the left surface 31L of the first coupler 3 which is located above the fourth flat cable holder 314. In other words, the fourth flat cable holder 314 is located to the left of the portion of the left surface 31L of the first coupler 3 which is located above the fourth flat cable holder 314. A portion of the intermediate portion 74C which is located above its portion held by the fourth flat cable holder 314 extends along the left surface 31L of the first coupler 31. The intermediate portion 71C of the first flat cable 71 extends in the up and down direction at a predetermined distance from the left surface 31L of the first coupler 31. As a result, the intermediate portion 71C of the first flat cable 71 and the intermediate portion 74C of the fourth flat cable 74 are kept spaced apart from each other in the right and left direction, thereby suppressing adverse effects due to each other's noise.

As illustrated in FIGS. 3 and 9, the other end 74B of the fourth flat cable 74 is connected to the connector C74 disposed on the second surface 90B of the control board 90. As illustrated in FIG. 9, the other end 74B of the fourth flat cable 74 is connected to the control board 90 in front of the other end 75B of the USB cable 75 and at a rear of the other end 73B of the third flat cable 73.

As illustrated in FIGS. 3 and 9, the WLAN board 97 is connected to the control board 90. The WLAN board 97 is operated for transmission of information between the control board 90 and external information processing devices via, e.g., wireless LAN. As illustrated in FIG. 9, the WLAN board 97 is connected to the control board 90 in front of the other end 74B of the fourth flat cable 74 and at a rear of the other end 73B of the third flat cable 73. A portion of the WLAN board 97 protrudes upward so as to be located above the upper end portion 90E of the control board 90. The first to fourth flat cables 71-74 and the USB cable 75 are spaced apart from the WLAN board 97 to prevent the WLAN board 97 from carrying out transmission and reception with lowered performance.

Each electric component such as the first and second reading sensors 3A, 3B, the driving device 3M, the motor 4M, the panel control board 28D, the USB connector 98, and the modem connector 99 is one example of an electronic component. Each of the first and second reading sensors 3A, 3B is one example of an image reader. Each of the wire harness 50, the first to fourth flat cables 71-74, and the USB cable 75 is one example of a wire. The cables 51-53, specifically, the covered wires respectively constituting the cables 51-53 are one example of at least one specific wire. The up and down direction is one example of a direction in which the at least one specific wire is inserted. The connectors C51, C52, C53 are one example of a plurality of specific connectors. The front and rear direction is one example of a second direction.

The connectors C71-C74 connected to the other ends 71B-74B of the respective first to fourth flat cables 71-74 are arranged in the front and rear direction on the upper end portion 90E of the control board 90. The positioner 101 overlaps the other ends 71B, 73B, 74B of the respective first, third, and fourth flat cables 71, 73, 74 when viewed in a direction indicated by the arrow Y (see FIG. 9) as the front and rear direction. The cables 51-53 illustrated in FIG. 8 are positioned in the positioner 101, whereby the cables 51-53 and the other ends 71B, 73B, 74B of the respective first, third, and fourth flat cables 71, 73, 74 are arranged in the front and rear direction. It is noted that the positioner 101 does not fix the cables 51-53 to specific positions, and the cables 51-53 are movable in some degree in the state in which the cables 51-53 are positioned in the positioner 101.

Effects

In the image reading apparatus 1 according to the first embodiment, the cables 51-53 of the wire harness 50 are positioned by being surrounded with the positioner 101 formed with the insulated sheet 100 at a position located farther from the insulated sheet 100 than the second surface 90B. This positioning prevents the cables 51-53 from moving toward the other wires such as the first to fourth flat cables 71-74 and the USB cable 75. Accordingly, even in the case where a reduced size of the control board 90 results in the connectors C51-053, C71-C74 arranged close to each other on the control board 90, the cables 51-53 positioned by the positioner 101 and the other wires, such as the first to fourth flat cables 71-74 and the USB cable 75, are less affected by each other's noise. Specifically, the first and second flat cables 71, 72 connected to the respective first and second reading sensors 3A, 3B are not easily affected by noise, making it possible to suppress disturbance in image data created by reading of the first and second reading sensors 3A, 3B. Also, the third flat cable 73 connected to the panel control board 28D is not easily affected by noise, making it possible to suppress disturbance in display data and input data transferred via the panel control board 28D. Also, the fourth flat cable 74 connected to the modem connector 99 is not easily affected by noise, making it possible to suppress disturbance in communication data transferred via the modem connector 99. Also, the USB cable 75 is not easily affected by noise, making it possible to suppress disturbance in communication data transferred via the USB connector 98.

In the image reading apparatus 1 according to the first embodiment, accordingly, it is possible to reduce the size of the control board 90 with suppression of operational failures and performance deterioration of the electronic components such as the first and second reading sensors 3A, 3B. Also, the insulated sheet 100 is formed with the extending portion 102 and the bent portion 110 each having a simple shape, making it possible to easily form the positioner 101 by bending the extending portion 102 and the bent portion 110. This reduces the number of components and manufacturing cost in this image reading apparatus 1.

In this image reading apparatus 1, as illustrated in FIG. 9, the positioner 101 overlaps the second surface 90B when viewed in the direction indicated by the arrow Z as the right and left direction. With this configuration, the positioner 101 is formed near the control board 90, which reduces or substantially eliminates a portion of the positioner 101 which lies off an edge of the control board 90. This prevents increase in size of this image reading apparatus 1 due to a space occupied by the positioner 101.

In this image reading apparatus 1, as illustrated in FIG. 7, when viewed in the up and down direction, the space having the substantially rectangular shape in cross section is defined by (i) a plate-like portion of the positioner 101 (a portion of the engaging portion 115 as one example of a plate portion) which extends from the extending portion 102 and (ii) a portion of the positioner 101 which is formed by bending the bent portion 110. This configuration makes it easy to dispose the substantially rectangular positioner 101 along a component near the positioner 101 such as the flat plate 92A of the second frame 92.

In this image reading apparatus 1, the bent portion 110 first surrounds the cables 51-53 while being bent. Next, as illustrated in FIG. 8, the cables 51-53 are accommodated or held in the positioner 101 by bending the restrainer 119 after the protrusion 117 and the restrainer 119 are inserted through the insertion hole 111H formed in the distal end portion 111 of the bent portion 110. The bent restrainer 119 prevents the protrusion 117 from being removed out of the insertion hole 111H. This configuration may keep the bent shape of the bent portion 110 without adhesives or other similar materials or components, enabling easy operation for placing the cables 51-53 in the positioner 101.

In this image reading apparatus 1, as illustrated in FIG. 7, the extending portion 102 extends along the flat plate 92A of the second frame 92. With this configuration, the flat plate 92A of the second frame 92 serves to reinforce the extending portion 102, thereby further stably positioning the cables 51-53 in the positioner 101.

In this image reading apparatus 1, as illustrated in FIG. 9, the connectors C71-C74 connected to the other ends 71B-74B of the respective first to fourth flat cables 71-74 are arranged in the front and rear direction on the upper end portion 90E of the control board 90. The positioner 101 overlaps the other ends 71B, 73B, 74B of the respective first, third, and fourth flat cables 71, 73, 74 when viewed in the direction indicated by the arrow Y (see FIG. 9) as the front and rear direction. With this configuration, even when the cables 51-53 positioned in the positioner 101 and the other ends 71B, 73B, 74B of the respective first, third, and fourth flat cables 71, 73, 74 are arranged close to each other, the cables 51-53 and the other ends 71B, 73B, 74B do not contact each other easily. Accordingly, the cables 51-53 and the first, third, and fourth flat cables 71, 73, 74 are less affected by each other's noise.

Second Embodiment

Figure 12:
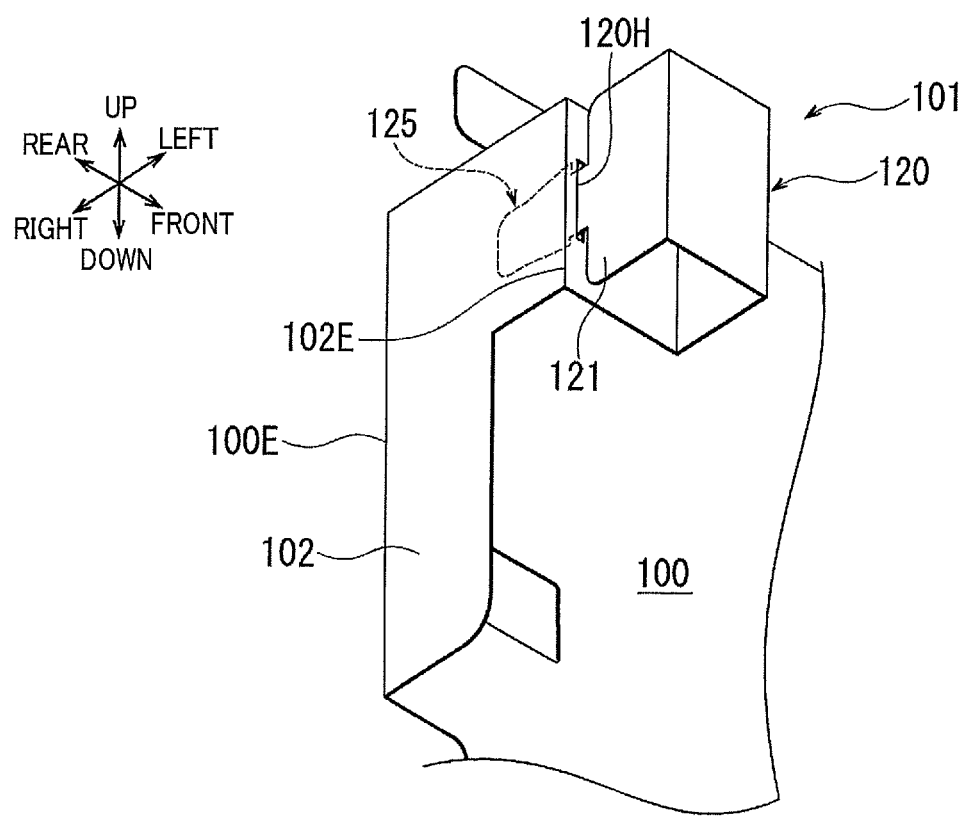
FIG. 12 is a partial perspective view of the positioner formed with the insulated sheet in an image reading apparatus according to a second embodiment.

FIG. 12 illustrates the positioner 101 of an image reading apparatus according to a second embodiment. This positioner 101 includes a bent portion 120 and an engaging portion 125 instead of the bent portion 110 and the engaging portion 115 in the first embodiment. The second embodiment is similar to the first embodiment in the other configuration. Thus, the same reference numerals as used in the first embodiment are used to designate the corresponding elements of the second embodiment, and an explanation of which is dispensed with.

The bent portion 120 is bent frontward from the left end 102E of the extending portion 102, then bent leftward, and bent rearward. A distal end portion 121 of the bent portion 120 is bent leftward toward the left end 102E. An insertion hole 120H is formed in the bent portion 120 at a position near the left end 102E.

The bent portion 120 has the engaging portion 125 that is a small protrusion protruding from the distal end portion 121. After the bent portion 120 is bent at the plurality of positions as described above, the engaging portion 125 is fitted into the insertion hole 120H, thereby keeping the bent shape of the bent portion 120.

Third Embodiment

Figure 13:
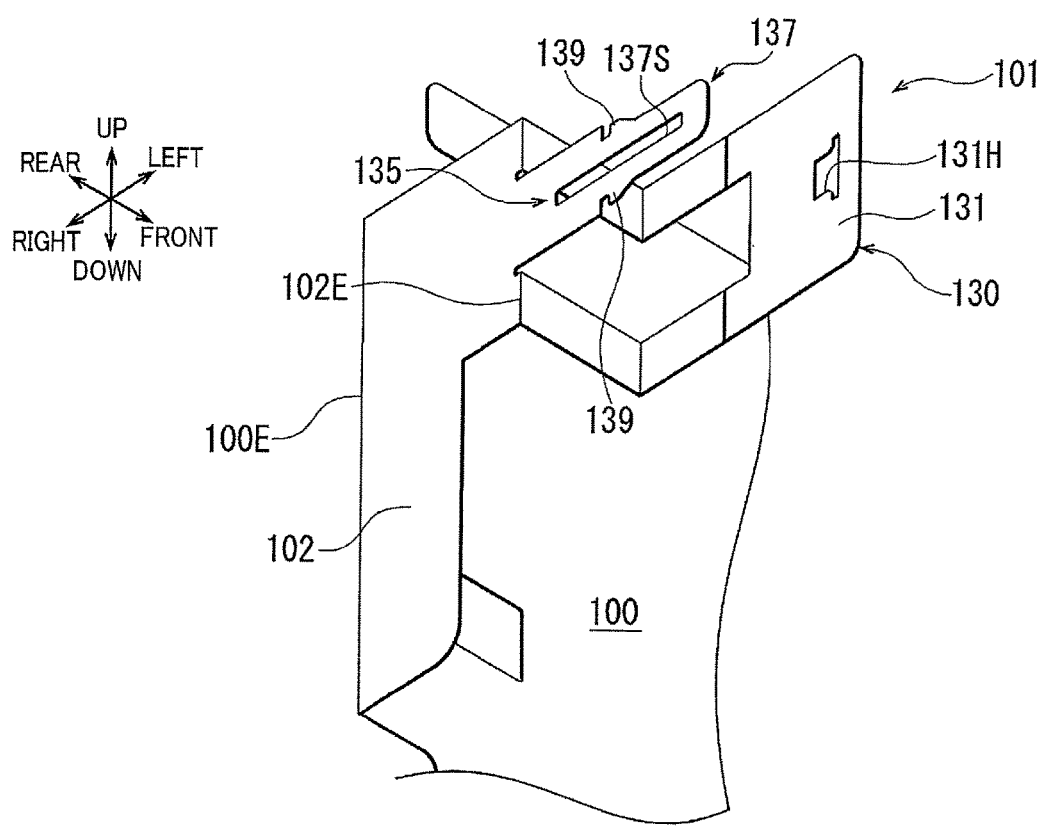
FIG. 13 is a partial perspective view of the positioner formed with the insulated sheet in an image reading apparatus according to a third embodiment.

FIG. 13 illustrates the positioner 101 of an image reading apparatus according to a third embodiment. This positioner 101 includes a bent portion 130 and an engaging portion 135 instead of the bent portion 110 and the engaging portion 115 in the first embodiment. The third embodiment is similar to the first embodiment in the other configuration. Thus, the same reference numerals as used in the first embodiment are used to designate the corresponding elements of the third embodiment, and an explanation of which is dispensed with.

The bent portion 130 and the engaging portion 135 are connected to the left end 102E of the extending portion 102. The bent portion 130 is bent frontward from the left end 102E of the extending portion 102, then bent leftward, and then bent rearward from the state of the bent portion 130 which is illustrated in FIG. 13. An insertion hole 131H is formed through a distal end portion 131 of the bent portion 130. The insertion hole 131H has two portions, one of which is greater than the other in width in the up and down direction.

The engaging portion 135 extends leftward from an intermediate portion of the left end 102E of the extending portion 102, while the bent portion 130 is bent from the left end 102E as described above.

The engaging portion 135 is provided with a protrusion 137 and upper and lower restrainers 139. The protrusion 137 is a distal end portion of the engaging portion 135 which has the width smaller than that of the other portion in the up and down direction. A central portion of the protrusion 137 in the up and down direction has a slit 137S extending in the right and left direction. The upper restrainer 139 protrudes upward from an upper edge of the protrusion 137. The lower restrainer 139 protrudes downward from a lower edge of the protrusion 137. The slit 137S enables the protrusion 137 to be deformed such that the upper restrainer 139 and the lower restrainer 139 are brought closer to each other.

Though not illustrated, the protrusion 137 is inserted through the insertion hole 131H, with the upper restrainer 139 being bent downward, and the lower retainer 139 being bent upward. When these retainers 139 are thereafter changed back to their respective original shapes, the restrainers 139 are engaged with an edge of the insertion hole 131H. As a result, the bent shape of the bent portion 130 is kept.

While the embodiments have been described above, it is to be understood that the disclosure is not limited to the details of the illustrated embodiments, but may be embodied with various changes and modifications, which may occur to those skilled in the art, without departing from the spirit and scope of the disclosure. For example, the wires positioned by the positioner 101 are not limited to the cables 51-53 and may be other wires. The position of the positioner 101 and/or the number of the positioners 101 may be changed depending upon positions and/or the number of cables and/or harnesses.

The present disclosure may be applied to electronic devices such as image reading apparatuses, image forming apparatuses, and MFPs, for example.

What is claimed is:

1. An electronic device, comprising:
a housing;
a plurality of wires;
a plurality of electronic components provided in the housing;
a control board provided in the housing and connected to the plurality of electronic components via the plurality of wires, the control board being configured to control the plurality of electronic components, the control board comprising a first surface and a second surface that is a back of the control board from the first surface, the plurality of wires comprising at least one specific wire;
a first frame provided in the housing and opposed to the first surface of the control board, the first frame supporting the control board;
a plurality of connectors arranged on the second surface of the control board, at least one of the plurality of wires each being connected to a corresponding one of the plurality of connectors;
an insulated member interposed between the first frame and the first surface of the control board, wherein the first frame, the insulated member, and the control board overlap each other in a first direction; and
a positioner formed on the insulated member and extending from the insulated member toward the control board in the first direction, the positioner being configured to position the at least one specific wire at a position farther from the insulated member than the second surface,
wherein the positioner comprises
an extending portion extending in the first direction from an edge of the insulated member to a position farther from the insulated member than the second surface,
a bent portion connected to the extending portion and bent so as to surround the at least one specific wire, and
an engaging portion extending from the extending, portion in the first direction independently of the bent portion, and the engaging portion is engageable with a distal end portion of the bent portion.

2. The electronic device according to claim 1, wherein the positioner overlaps the second surface when viewed in the first direction.

3. The electronic device according to claim 1,
wherein the positioner comprises a plate portion extending from the extending portion, and
wherein the bent portion is bent such that a space having a substantially rectangular shape in cross section is defined by the plate portion and the bent portion when viewed in a direction in which the at least one specific wire is inserted in the positioner.

4. The electronic device according to claim 1, wherein the engaging portion comprises:
a protrusion insertable in a through hole formed in the distal end portion of the bent portion; and
a restrainer that is a portion of the protrusion and that is bent after the protrusion and the restrainer are inserted in the through hole.

5. The electronic device according to claim 1, further comprising a second frame located adjacent to the first frame and extending in the first direction,
wherein the extending portion extends along the second frame.

6. The electronic device according to claim 1, further comprising at least one flat cable each as one of the plurality of wires,
wherein the at least one flat cable is arranged side by side with the at least one specific wire in a second direction substantially perpendicular to each of the first direction and a direction in which the at least one specific wire is inserted in the positioner, and
wherein the positioner overlaps the at least one flat cable when viewed in the second direction.

7. The electronic device according to claim 6, further comprising a plurality of flat cables comprising the at least one flat cable,
wherein the plurality of connectors connected respectively to the plurality of flat cables are arranged in the second direction on an end portion of the control board which extends in the second direction.

8. The electronic device according to claim 6,
wherein the plurality of electronic components comprise an image reader, and
wherein the at least one flat cable is connected to the image reader.

9. The electronic device according to claim 1,
wherein the plurality of wires comprise a plurality of specific wires comprising the at least one specific wire,
wherein the plurality of connectors comprise a plurality of specific connectors to which the plurality of specific wires are respectively connected,
wherein the plurality of specific connectors are arranged in a second direction substantially perpendicular to each of the first direction and a direction in which the at least one specific wire is inserted in the positioner, and
wherein the plurality of specific wires are bundled together in the positioner.

10. The electronic device according to claim 1, wherein the positioner is configured to position the at least one specific wire at the position farther from the insulated member than the second surface in the first direction.

11. The electronic device according to claim 1, wherein a length of the bent portion is less than that of the extending portion in the direction in which the at least one specific wire is inserted in the positioner.

12. The electronic device according to claim 1, wherein the first frame, the insulated member, the control board, and the positioner are arranged in this order in the first direction.

13. An electronic device, comprising:
a housing;
a plurality of wires;
a plurality of electronic components provided in the housing;
a control board provided in the housing and connected to the plurality of electronic components via the plurality of wires, the control board being configured to control the plurality of electronic components, the control board comprising a first surface and a second surface that is a back of the control board from the first surface, the plurality of wires comprising at least one specific wire;
a first frame provided in the housing and opposed to the first surface of the control board, the first frame supporting the control board;
a plurality of connectors arranged on the second surface of the control board, at least one of the plurality of wires each being connected to a corresponding one of the plurality of connectors;
an insulated member interposed between the first frame and the first surface of the control board, wherein the first frame, the insulated member, and the control board overlap each other in a first direction; and
a positioner formed on the insulated member and extending from the insulated member toward the control board in the first direction, the positioner being configured to position the at least one specific wire at a position farther from the insulated member than the second surface,
wherein the positioner comprises
an extending portion extending in the first direction from an edge of the insulated member to a position farther from the insulated member than the second surface,
a bent portion connected to the extending portion and bent so as to surround the at least one specific wire, and
a plate portion extending from the extending portion, wherein the bent portion is bent such that a space having a substantially rectangular shape in cross section is defined by the plate portion and the bent portion when viewed in a direction in which the at least one specific wire is inserted in the positioner.

14. An electronic device, comprising:
a housing;
a plurality of wires;
a plurality of electronic components provided in the housing;
a control board provided in the housing and connected to the plurality of electronic components via the plurality of wires, the control board being configured to control the plurality of electronic components, the control board comprising a first surface and a second surface that is a back of the control board from the first surface, the plurality of wires comprising at least one specific wire;
a first frame provided in the housing and opposed to the first surface of the control board, the first frame supporting the control board;
a plurality of connectors arranged on the second surface of the control board, at least one of the plurality of wires each being connected to a corresponding one of the plurality of connectors;
an insulated member interposed between the first frame and the first surface of the control board, wherein the first frame, the insulated member, and the control board overlap each other in a first direction; and
a positioner formed on the insulated member and extending from the insulated member toward the control board in the first direction, the positioner being configured to position the at least one specific wire at a position farther from the insulated member than the second surface,
wherein the positioner comprises
an extending portion extending in the first direction from an edge of the insulated member to a position farther from the insulated member than the second surface, and
a bent portion connected to the extending portion and bent so as to surround the at least one specific wire,
wherein a length of the bent portion is less than that of the extending portion in the direction in which the at least one specific wire is inserted in the positioner.

* * * * *